US012631462B2

(12) United States Patent
Boone et al.

(10) Patent No.: US 12,631,462 B2
(45) Date of Patent: May 19, 2026

(54) DYNAMIC CONTROL OF AIR QUALITY IN A GEO-FENCING AREA

(71) Applicant: International Business Machines Corporation, Armonk, NY (US)

(72) Inventors: Michael Boone, Lutz, FL (US); Jeremy R. Fox, Georgetown, TX (US); Tushar Agrawal, West Fargo, ND (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 18/385,630

(22) Filed: Oct. 31, 2023

(65) Prior Publication Data

US 2025/0137790 A1 May 1, 2025

(51) Int. Cl.
*G01C 21/34* (2006.01)
*B60W 20/40* (2016.01)

(52) U.S. Cl.
CPC ......... *G01C 21/3469* (2013.01); *B60W 20/40* (2013.01); *G01C 21/3461* (2013.01)

(58) Field of Classification Search
CPC ........................... G01C 21/3469; B60W 20/40
USPC ........................................................ 701/22
See application file for complete search history.

(56) References Cited

U.S. PATENT DOCUMENTS

| | | | |
|---|---|---|---|
| 8,744,756 B2 | 6/2014 | Gerstberger et al. | |
| 8,825,369 B2 | 9/2014 | Jin | |
| 9,440,644 B2 | 9/2016 | Porras et al. | |
| 9,646,439 B2 | 5/2017 | Ricci | |

(Continued)

FOREIGN PATENT DOCUMENTS

| | | |
|---|---|---|
| CN | 106845371 B | 10/2019 |
| IN | 201644009228 A | 11/2016 |

OTHER PUBLICATIONS

US EPA, "Getting to the Core: The Link Between Temperature and Carbon Dioxide", https://archive.epa.gov/climatechange/kids/documents/temp-and-co2.pdf, Accessed on Oct. 31, 2023, 16 pages.
IBM, "Emissions Management", https://envizi.com/solutions/emissions-management-ghg-software/, Accessed on Oct. 31, 2023, 10 pages.
IBM, "Decarbonization", https://envizi.com/solutions/energy-management-software/, Accessed on Oct. 31, 2023, 7 pages.

(Continued)

*Primary Examiner* — Navid Z. Mehdizadeh
*Assistant Examiner* — Vincent Feng
(74) *Attorney, Agent, or Firm* — Scully, Scott, Murphy & Presser, P.C.; Kelsey Skodje

(57) ABSTRACT

A V2X computing system to manage air quality by reducing carbon emissions by changing a vehicle mode of operation from fuel to battery. The system identifies the position of the vehicle and changes the mode of the vehicle to a target battery-based vehicle. The system calculates how much aggregated emission can be allowed within a defined time range around a geo-fencing area to identify appropriate distribution of battery-operated vehicle and fossil fuel-based vehicle to ensure the required air-quality. The system leverages historical data around environmental parameters like wind direction, speed, etc. for a period to calculate the emission requirements vs. predicted emission. The system uses this data to dynamically switch vehicle from using fuel power to battery power based on the capability available within the vehicle for environmental sustainability. The system further spaces vehicles appropriately to ensure the air quality is maintained on the road in a geo-fenced area.

20 Claims, 6 Drawing Sheets

<u>10</u>

(56) References Cited

U.S. PATENT DOCUMENTS

| | | | |
|---|---|---|---|
| 10,438,125 B2 | 10/2019 | Bai et al. | |
| 10,444,211 B2 | 10/2019 | Bai et al. | |
| 10,830,743 B2 | 11/2020 | Bai et al. | |
| 10,830,922 B2 | 11/2020 | Li et al. | |
| 11,034,345 B2 | 6/2021 | Correia et al. | |
| 11,215,995 B2 | 1/2022 | Sawada et al. | |
| 11,279,339 B2 | 3/2022 | Hagimoto et al. | |
| 11,326,800 B2 | 5/2022 | Schindler et al. | |
| 11,333,512 B2 | 5/2022 | Van Der Sluis | |
| 2016/0298576 A1 | 10/2016 | Reddy et al. | |
| 2017/0193788 A1 | 7/2017 | Kim et al. | |
| 2019/0206238 A1 | 7/2019 | Hofsaess | |
| 2020/0037127 A1 | 1/2020 | Hwang et al. | |
| 2021/0323533 A1 | 10/2021 | Park | |
| 2021/0331662 A1* | 10/2021 | Gaither | B60W 40/02 |
| 2022/0165152 A1* | 5/2022 | Hendrikx | G08G 1/0125 |

OTHER PUBLICATIONS

IBM, "IBM Acquires Envizi to Help Organizations Accelerate Sustainability Initiatives and Achieve Environmental Goals", https://newsroom.ibm.com/2022-01-11-IBM-Acquires-Envizi-to-Help-Organizations-Accelerate-Sustainability-Initiatives-and-Achieve-Environmental-Goals, Jan. 11, 2022, 3 pages.

IBM, "Sustainability solutions for Government services", https://www.ibm.com/impact/sustainability, Accessed on Oct. 31, 2023, 6 pages.

IBM, "Transformative automotive IT solutions ", https://www.ibm.com/industries/automotive, Accessed on May 24, 2023, 4 pages.

IBM, "Managing Climate Risk", https://www.ibm.com/resources/guides/business-operations/manage-climate-risk/, Accessed on Oct. 31, 2023, 8 pages.

Disclosed Anonymously, "System and Method to Control Air Pollution Caused by Motor Vehicle using Internet of Things", an IP.com Prior Art Database Technical Disclosure, IP.com No. IPCOM000248445D, Nov. 30, 2016, 5 pages.

* cited by examiner

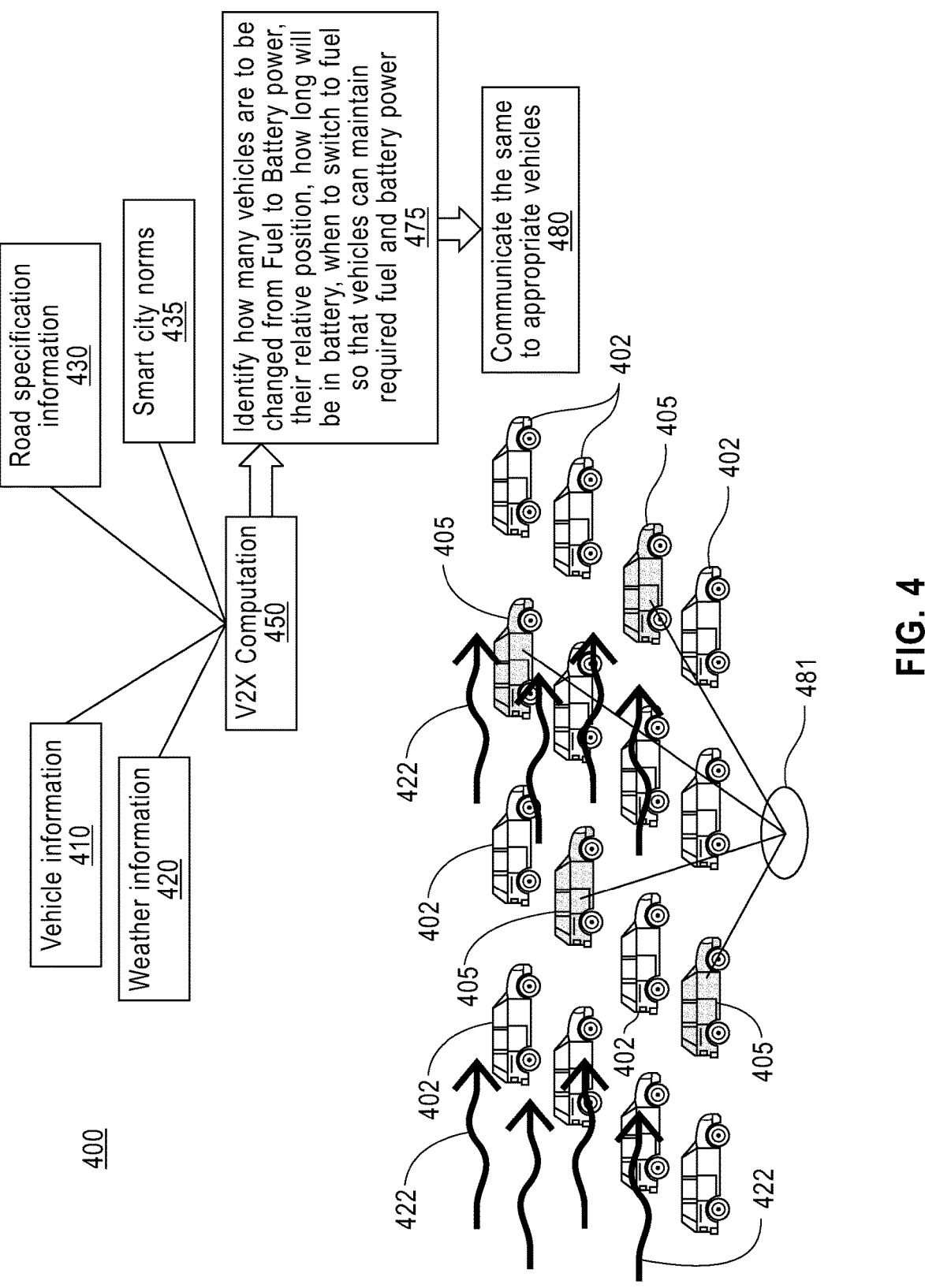

Road specification information 430

Smart city norms 435

Identify how many vehicles are to be changed from Fuel to Battery power, their relative position, how long will be in battery, when to switch to fuel so that vehicles can maintain required fuel and battery power 475

Communicate the same to appropriate vehicles 480

Vehicle information 410

Weather information 420

V2X Computation 450

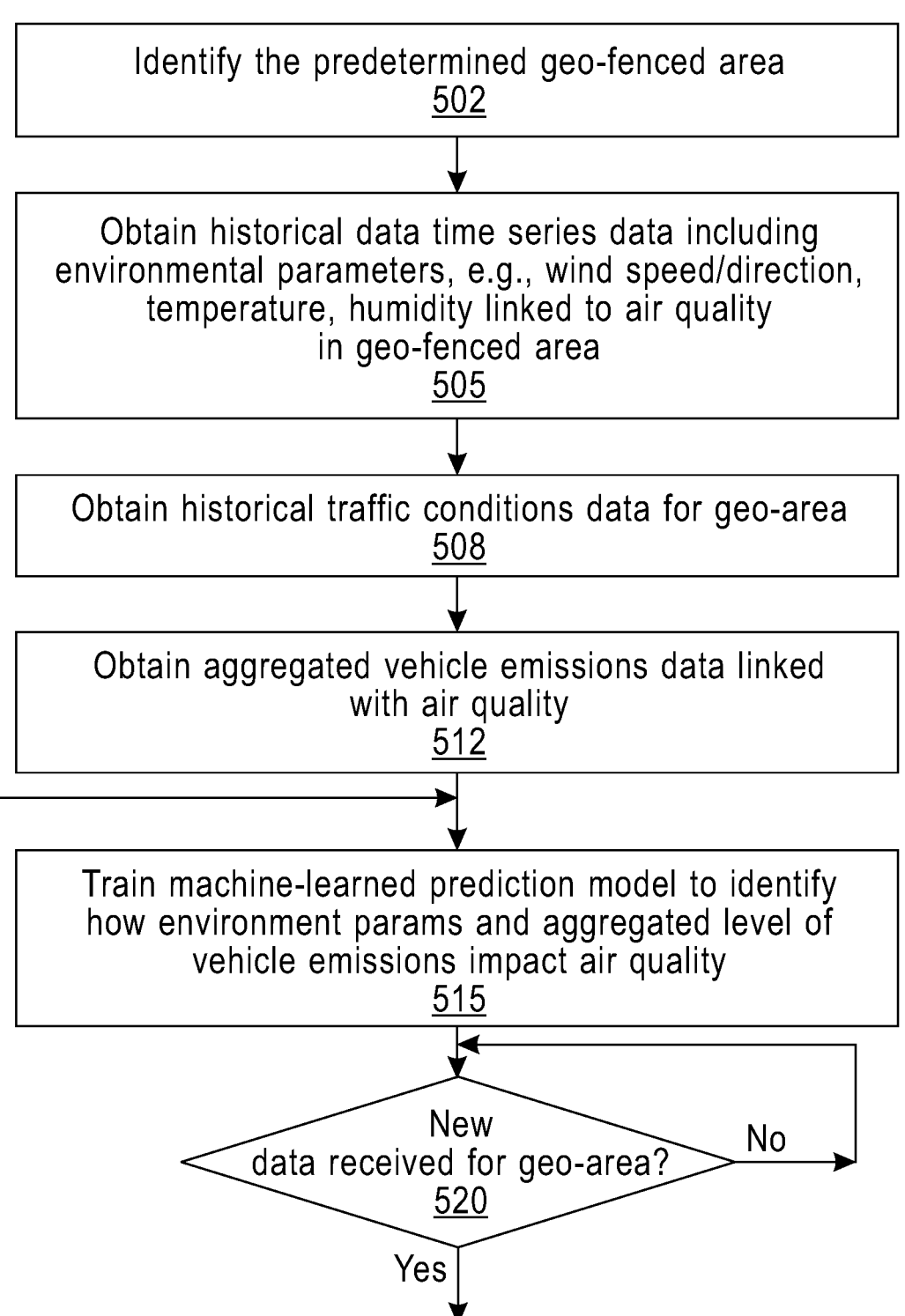

Identify the predetermined geo-fenced area
502

Obtain historical data time series data including
environmental parameters, e.g., wind speed/direction,
temperature, humidity linked to air quality
in geo-fenced area
505

Obtain historical traffic conditions data for geo-area
508

Obtain aggregated vehicle emissions data linked
with air quality
512

Train machine-learned prediction model to identify
how environment params and aggregated level of
vehicle emissions impact air quality
515

New
data received for geo-area?
520

No

Yes

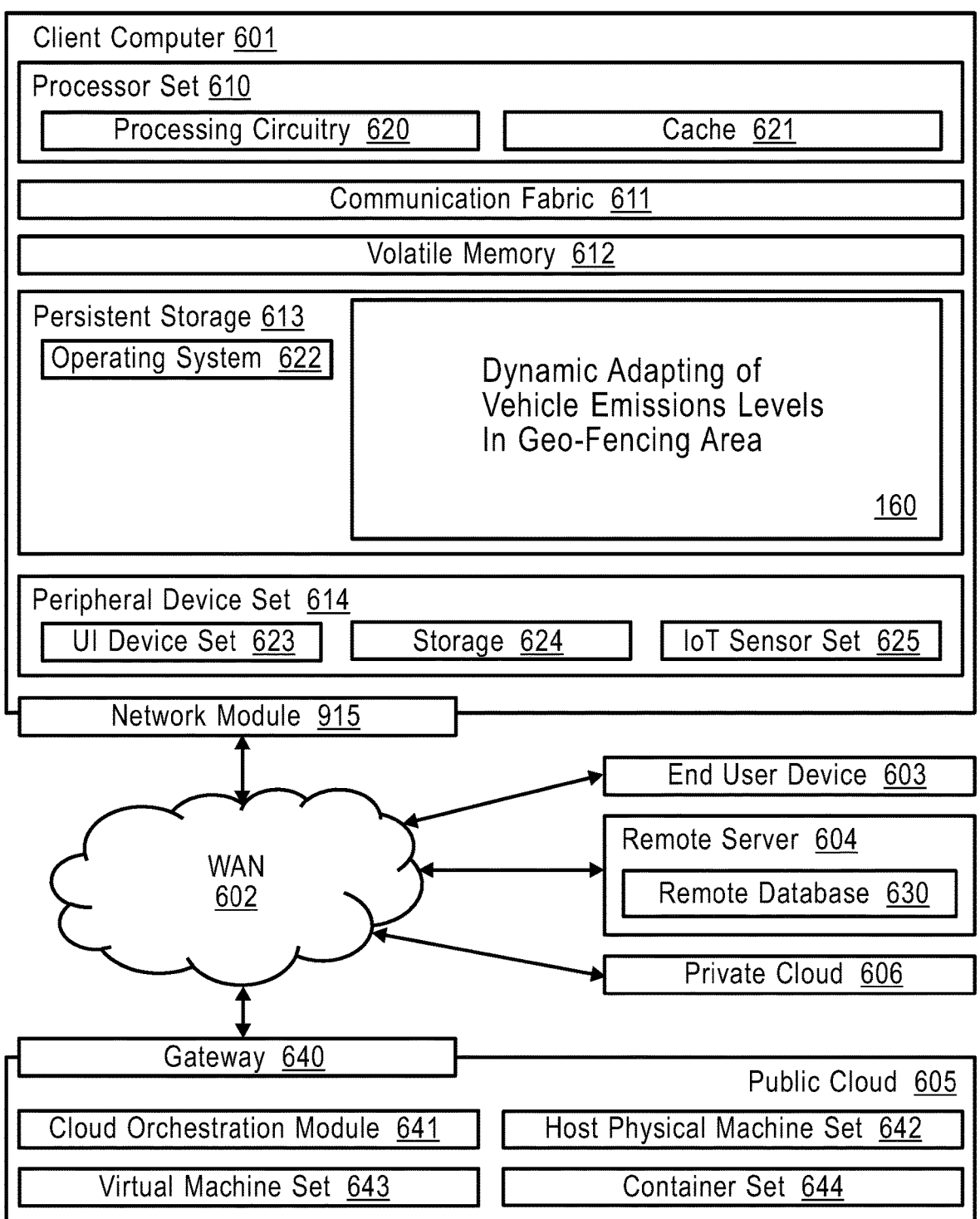

Client Computer 601

Processor Set 610

Processing Circuitry 620    Cache 621

Communication Fabric 611

Volatile Memory 612

Persistent Storage 613

Operating System 622

Dynamic Adapting of Vehicle Emissions Levels In Geo-Fencing Area

160

Peripheral Device Set 614

UI Device Set 623    Storage 624    IoT Sensor Set 625

Network Module 915

End User Device 603

Remote Server 604

Remote Database 630

WAN 602

Private Cloud 606

Gateway 640

Public Cloud 605

Cloud Orchestration Module 641    Host Physical Machine Set 642

Virtual Machine Set 643    Container Set 644

FIG. 6

DYNAMIC CONTROL OF AIR QUALITY IN A GEO-FENCING AREA

BACKGROUND

This disclosure relates generally to systems and methods for controlling air quality including the controlling of vehicle emissions, and more particularly, to a system and process for automatically communicating and responding to messages for dynamically adapting the operation of hybrid vehicles to reduce pollution emissions in a defined area.

A hybrid vehicle is one that uses two or more distinct types of power: fossil fuel-based power and electrical, i.e., battery generated, power. The basic principle with hybrid vehicles is that the different motors work better at different speeds; the electric motor is more efficient at producing torque, or turning power, and the combustion engine is better for maintaining high speed (better than a typical electric motor). Switching from one to the other at the proper time while speeding up yields a win-win in terms of energy efficiency, as such that translates into greater fuel efficiency, it can be Heavy vehicle, Personal Vehicle etc.

It is the case that, based on the number of vehicles are on the road, the level of air quality norms can reach or exceed acceptable air quality threshold limits. During a particular time period, if additional number of fuel-based power generated vehicles are running on the road, then air quality will be impacted.

SUMMARY

A system and method for identifying a level of pollution such as vehicle emissions in a specific area or location, and responsively determine an amount of vehicles to be placed in a electrical (battery) powered vehicle state versus an amount of vehicles to be maintained in a fuel-based powered state in order to maintain an air quality norm at a specific acceptable level.

A real-time or near real-time vehicle-to-everything (V2X) communication and processing system that can compute the level of pollution in a specific location and identify how many vehicles at that location should be changed to battery-power and how many vehicles are to be retained with fuel-power such that air quality norms can be maintained within the specific location.

In one embodiment, there is provided a computer-implemented system for controlling vehicle emissions. The system comprises: a memory storage device; and a hardware processor coupled to the memory storage device. The hardware processor is configured to perform a method to: detect a vehicle entry into a pre-determined area traveled by a plurality of vehicles; receive one or more environmental parameters representing a current weather condition in the pre-determined area; identify a number of vehicles traveling on one or more roads in the pre-determined area, and a type of vehicles in the area, the vehicle type being one of: battery powered, fuel powered, and hybrid powered such that the vehicle can be battery powered or fuel powered; receive associated emission parameters from each respective vehicle; calculate, based on the associated emission parameters and the environmental parameters of the current weather condition, an amount of aggregated emissions allowable within the pre-determined area for a defined time range; determine based on the calculated amount of aggregated emissions allowable within the pre-determined area, a number of hybrid powered vehicles in the pre-determined area that can be converted to a battery power mode of operation to render an emissions level in the area below a threshold limit; and communicate a message to one or more of the number of hybrid vehicles in the area, the message informing a hybrid vehicle to initiate a transforming of its operating mode from a fuel powered mode of operation to a battery powered mode of operation.

In a further embodiment, there is provided a method for controlling vehicle emissions. The method comprises: detecting, by a hardware processor, a vehicle entry into a pre-determined area traveled by a plurality of vehicles; receiving, at a hardware processor, one or more environmental parameters representing a current weather condition in the pre-determined area; identifying, at the hardware processor, a number of vehicles traveling on one or more roads in the pre-determined area, and a type of vehicles in the area, the vehicle type being one of: battery powered, fuel powered, and hybrid powered such that the vehicle can be battery powered or fuel powered; receiving, at the hardware processor, associated emission parameters from each respective vehicle; calculating, by the hardware processor, based on the associated emission parameters and the environmental parameters of the current weather condition, an amount of aggregated emissions allowable within the pre-determined area for a defined time range; determining, using the hardware processor, based on the calculated amount of aggregated emissions allowable within the pre-determined area, a number of hybrid powered vehicles in the pre-determined area that can be converted to a battery power mode of operation to render an emissions level in the area below a threshold limit; and communicating, using the hardware processor, a message to one or more of the number of hybrid vehicles in the area, the message informing a hybrid vehicle to initiate a transforming of its operating mode from a fuel powered mode of operation to a battery powered mode of operation.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 4 shows an example use-case scenario depicting the method and the resulting V2X system communications for performing dynamic adaptation of aggregated emissions level of vehicles to control air quality in any geo-fencing area;

FIG. 5 depicts a flow diagram showing a method for training a machine learned model used to predict aggregated emissions in order to dynamically adapt aggregated emissions level of vehicles to control air quality in any geo-fencing area of the present disclosure in an embodiment; and FIG. 6 depicts a computing environment containing an example of an environment for the execution of at least some of the computer code involved in performing the inventive methods according to the embodiments herein.

DETAILED DESCRIPTION

Figure 1:
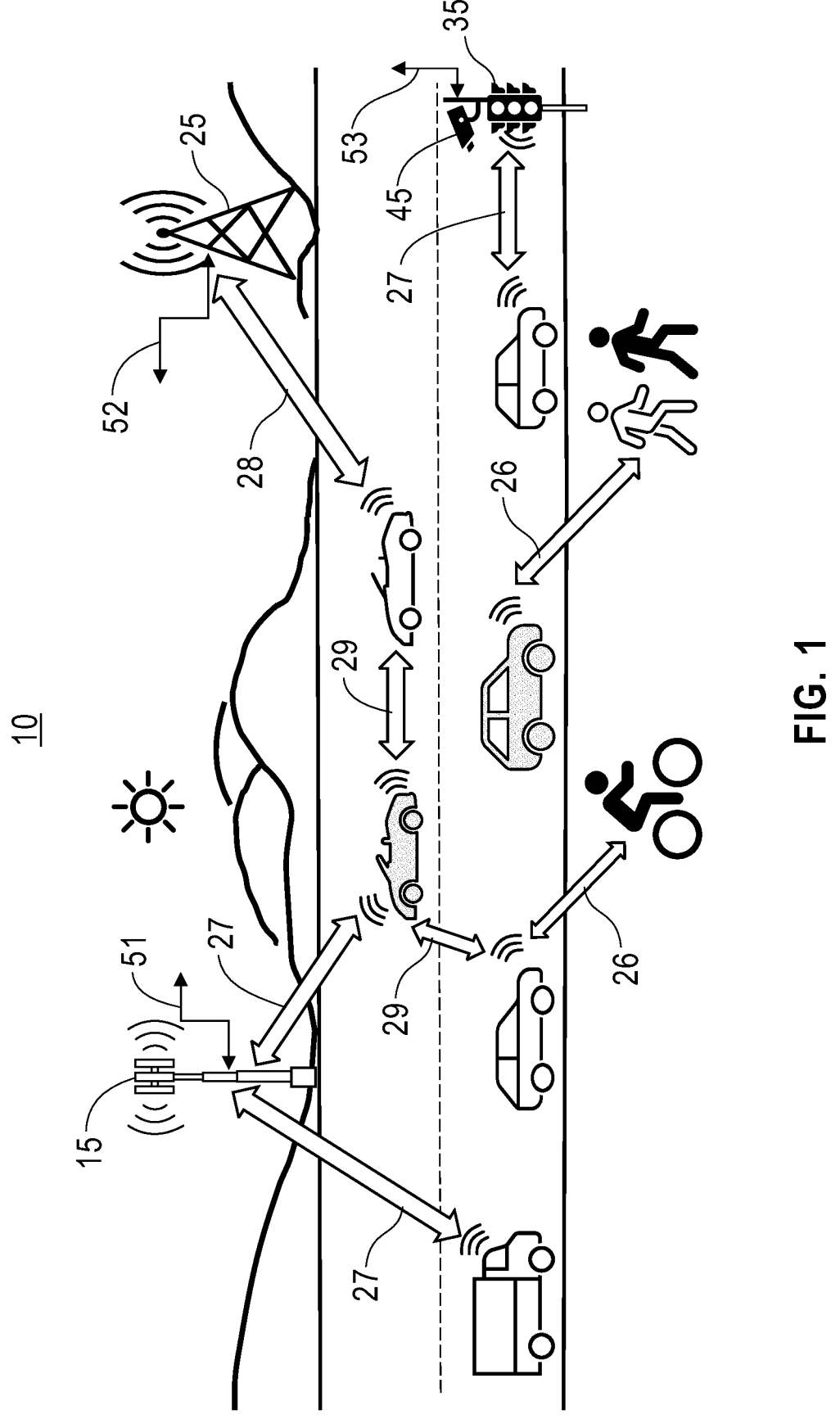
FIG. 1 shows an exemplary V2X system depicting communications and interfacing between and amongst vehicles and between vehicles and various communications/networked devices in an embodiment.

FIG. 1 shows an exemplary communications system infrastructure 10 employing a Vehicle-to-everything (V2X) system enabling dynamic, real-time communications of messages between and amongst vehicles 12 and between vehicles 12 and various network and roadside assistance units (RSU). As known, a Vehicle-to-everything (V2X) system provides a direct communication between a vehicle and any entity that may affect, or may be affected by, the vehicle. It is a vehicular communication system that incorporates other more specific types of communication including, but not limited to communications such as: V2I (vehicle-to-infrastructure) communications 27, V2N (vehicle-to-network) communications 28, V2V (vehicle-to-vehicle) communications 29, and V2P (vehicle-to-pedestrian) communications 26.

In an embodiment, V2V communication 29 is a wireless real-time data exchange between vehicles. Within a defined range, V2V technology provides a packet messaging infrastructure to deliver messages from surrounding vehicles thereby creating a wireless vehicular ad-hoc network. Messages communicated amongst vehicles can include data that would indicate a vehicle's speed, location, direction of travel, braking status, and any road alerts or hazards. Such messaging can include the sharing of information used by a vehicle's left turn assist (LTA), intersection movement assist (IMA), blind spot warning, forward collision warning vehicle system technology. One application is to provide messaging enabling the creation of a 360-degree awareness and relative positioning of all vehicles within the system's range. A V2V messaging standard is implemented such as WAVE (Wireless access for Vehicular Environments) that is built upon the Institute of Electrical and Electronics Engineers (IEEE) 802.11p wireless communications standard.

Further, in an embodiment, the Vehicle-to-infrastructure (V2I) technology allows vehicles to share and receive information with other devices on or near the roadway. Within the defined area, there may be connected cameras, roadside assistance units (RSU), roadside equipment, e.g., street-lights, signage, lane markers cameras, and more. For example, as shown in FIG. 1, an imaging device or camera 115 can be mounted at or situated at a traffic light or Roadside assistance unit and configured with circuitry responsive to control signals to obtain images of the traffic in the area, e.g., a vicinity of a traffic light. The V2I communications 27 is part of an infrastructure that also provides dedicated short-range communications links 51 between vehicles on the road (e.g., via On-Board Equipment, OBE), and these roadside infrastructure devices such as road-side assistance units (RSU) 15 that monitor traffic, provide traffic signals, etc., cell phone towers 20, traffic lights/sensors infrastructure 35, Internet-of-Things sensors such as cameras 45, etc. The communications with the roadway infrastructure devices allows the system to obtain complete, real-time traffic information of the entire area. Using OBE, vehicle sensors can detect any RSU signals, markings or signing along the roadside that can be used to automatically adjust vehicle parameters as necessary. In an example embodiment, roadside infrastructure devices, e.g., RSU 15, cell phone tower 25, traffic light/sensors infrastructure 35 each includes infrastructure enabling communication to a network 99 providing for cloud-based services. For example, via respective communication links 51, 52, 53, the RSU 15, cell phone tower 25 and traffic light/sensors infrastructure 35 can communicate messages over a network 99 to a processing server providing ability to perform dynamic adaptation of aggregated emission levels of vehicles to control air quality in a particular geo-fencing area (geo-area).

In an embodiment, a Vehicle-to-network (V2N) communications infrastructure is employed to enable cell communications connection between a vehicle to its surroundings, e.g., such as a connection to a vehicle to data center, a road infrastructure network, and other cars. V2N-connected vehicle can communicate with other devices/vehicles via mobile telecommunication protocols (e.g., 3GPP or long-term evolution (LTE) communications standard) or short-range wireless communications protocol (e.g., IEEE 802.11) to update and improve driving directions based on other drivers' locations.

Further, in an embodiment, Vehicle-to-pedestrian (V2P) is an infrastructure typically enabling a vehicle's on-board safety/monitoring tools to directly communicate with a pedestrian's mobile device, e.g., via wireless communications 26, e.g., Bluetooth, WiFi-Direct, etc., to avoid accidents. This could include people walking, riding bicycles, or even people entering and exiting public transit vehicles. If a vehicle is having trouble stopping at an intersection, for instance, its onboard systems can deliver a notification message (V2P communication 26) to nearby pedestrians that crossing the street needs to wait. The information communicated to a pedestrian can include a vehicle's speed, location and direction of approach.

Figure 2:
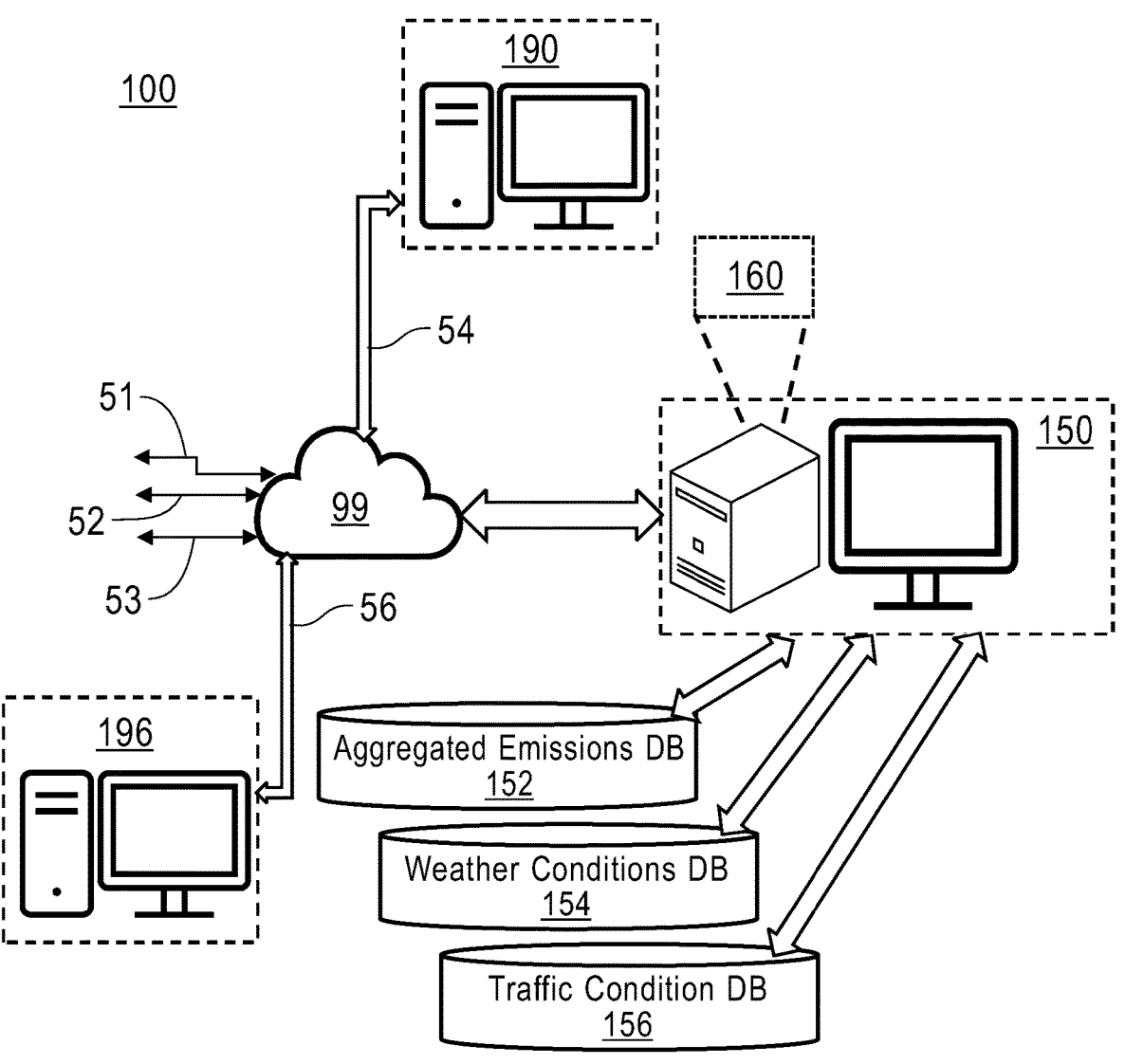
FIG. 2 illustrates a computing system for dynamic adaptation of aggregated emissions level of vehicles to control air quality in any geo-fencing area according to an embodiment.

FIG. 2 depicts a configuration of a V2X computing system 100 for analyzing realtime emission parameters and determining how the driving modes of the hybrid vehicles are to be changed, so that the emission levels are within air quality norms.

In FIG. 2, the V2X computing system 100 runs methods to manage air quality in a particular area. The V2X computing system includes an interconnection of multiple devices, e.g., computer nodes, transmitters, receivers, switches, routers, links, etc. forming a communications network 199. This communications network receives and communicates messages over communications channels or links 51, 52, 53 established by devices shown in FIG. 1 including, but not limited to: road-side assistance units, a cellular network communications node, and any road-side infrastructure (e.g., sensors, cameras). Alternatively, or in addition, communication links (not shown) can be established between and amongst vehicles for message communication of similar messages used to manage air quality in a particular area.

In FIG. 2, one computing device attached to network 199 is a V2X computing system server 150 running software 160 having instructions for determining an amount of hybrid vehicles in a defined area (e.g., a geo-area) that can be controlled to change a power mode of operation from fuel-powered to only battery-powered. That is, based on real-time vehicle traffic data and real-time weather conditions information in the predetermined area (geo-area), V2X computing system 100 can control air quality in the particular area. For example, based on messages received over communication links 51, 52, 53 received in real-time from one or more of: road-side assistance units, cellular network communications node, road-side infrastructure devices, or pedestrians (as shown in FIG. 1), and based on current or near real-time predicted weather information, e.g., obtained from weather-condition sensor information "feeds" 54, software 160 run at the V2X computing system server 150 includes instructions implementing methods to control air quality within air quality norms in a particular area particularly by controlling a switching of vehicles in a geo-fenced area to reduce their vehicle emissions, e.g., such as by commanding vehicles to switch from fuel-powered mode of operation to a battery-powered mode of operation. Additional methods to reduce vehicle emissions in the geo-area may include commanding vehicles to change their positioning relative to other vehicles, e.g., by switching lanes or by switching roads/routes (i.e., relative positioning). In an embodiment, the V2X computing system communicates message requests to vehicles to transit to other lanes, roads/routes or to locations within or outside the pre-determined area. By dynamic adaptation of aggregated vehicle emissions levels, system 100 maintains an acceptable air quality emissions level in the area.

In one embodiment, the V2X computing system server 150 runs software 160 having instructions implementing methods to manage the air quality by reducing the emission of carbon by determining and communicating vehicle operating mode changes to change the mode of one or more vehicles from fuel-powered to battery-powered. The V2X computing system server 150 identifies the position of the vehicle and will change the mode of the vehicle to a target battery-based vehicle.

In the management of air quality to reduce vehicle emissions, the V2X computing system server 150 runs software 160 having instructions implementing methods to manage the air quality by calculating how much aggregated emission can be allowed within a defined time range around a geo-fencing area to identify appropriate distribution of battery-operated vehicle and fossil fuel-based vehicle to ensure the required air-quality.

The V2X computing system server 150 further runs software 160 having instructions implementing methods to leverage historical data around environmental parameters like wind speed, etc. for a period to calculate the emission requirements vs. a predicted emission. The system server 150 uses this data to dynamically switch one or more vehicles from using fuel power to battery power based on the capability available within the vehicle for environmental sustainability. The system server 150 further appropriately spaces vehicles apart to ensure the air quality is maintained. In an embodiment, one or more vehicles may be moved out of the geo-fenced area to achieve that.

The V2X computing system server 150 further runs software 160 having instructions implementing methods to additionally identify the available battery power and the fuel with the vehicles to decide which vehicle(s) to switch operating power modes and which vehicle to not switch operating power modes and during what time frame to maintain the quality.

The V2X computing system server 150 further runs software 160 having instructions implementing methods to first assess an air quality when processing traditional fuel-powered and electric-powered vehicles. The air quality assessment for processing traditional and electric vehicles considers the following: i) Realtime air quality, such as measured by an air quality meter, and which can comprise an air quality index (AQI), parts per million (PPM) of a particular pollutant, etc.; ii) Wind flow parameters such as speed and direction of wind flow adjacent to the road surface; and iii). Carbon capture capabilities, e.g., presence and use of any device/process that captures $CO_2$ from activity in any geo-fencing area.

Based on the air quality norms in the geo-fencing area, the V2X computing system server 150 runs software 160 having instructions implementing methods to calculate how much aggregated emission can be allowed within a defined time range around the geo-fencing area, and accordingly with V2X computation, the V2X computing system identifies an appropriate distribution between battery operated vehicles and fossil fuel-based vehicles to ensure required air quality.

In the management of air quality to reduce vehicle emissions, the V2X computing system server 150 considers environmental parameters, e.g., levels of (CO, NO, $SO_2$, $CO_2$, etc.), temperature, relative humidity, air quality index (AQI), wind flow/velocity, wind direction, elevation, visibility, etc. That is, with respect to air quality assessment for processing traditional and electric vehicles, the V2X computing system runs software 160 having instructions implementing methods to use historical learning to identify how the environmental parameters and aggregated level of vehicle emissions are linked with air quality, like wind flow parameters ($CO_2$) emission from one geo-fencing area that can propagate to another geo-fencing area), temperature, humidity etc. to identify how much aggregated emission can be allowed within a time frame in different geo-fencing area. To this end, V2X computing system server 150 runs a machine-learned model trained to correlate and predict an air quality in an area to aggregated levels of vehicle emissions and wind flow parameters in the area.

In the management of air quality to reduce vehicle emissions, the V2X computing system server 150 considers aggregated emissions limit(s). That is, with respect to air quality assessment for processing traditional and electric vehicles, the V2X computing system server 150 runs software 160 having instructions implementing methods to dynamically identify the allowed aggregated emission limit, current traffic load, etc., and uses this data in the V2X computation to identify appropriate distribution of different types of vehicles on the road, considering their respective emission level health quality, volume of exhaust gas, etc. The V2X system server 150 responsively communicates control messages to vehicles to further control the number of vehicles, scheduling and conversion of the vehicles from fossil fuel to battery operated (in hybrid vehicles).

Further in the management of air quality to reduce vehicle emissions, the V2X computing system considers weather and airflow inclusion and planning and traffic flow. That is, with respect to air quality assessment for processing traditional and electric vehicles, the V2X computing system runs software 160 having instructions implementing methods to identify dynamic wind flow parameters and changes in the weather condition, and accordingly select which vehicles (e.g., numbers of vehicles and their relative positions) can be retained to fuel based driving and which vehicles are to be changed to battery-operated dynamically, so that aggregated air quality norms can be maintained to align with dynamic weather parameter change and impacts to the traffic flow.

Further in the management of air quality to reduce vehicle emissions, the V2X computing system considers a distribution for electric vehicles (EV's) versus traditional emissions (fossil-fuel-based vehicles. That is, with respect to air quality assessment for processing traditional and electric vehicles, the V2X computing system considers the wind flow parameters, direction of wind flow, geo-fencing area-based air quality norms (e.g., represented as an air quality measure), and accordingly with V2X computation, instructs an appropriate spacing among the vehicles, i.e., to cause a distribution of fuel and battery-operated vehicles so that the air quality is according to the norms.

The V2X computing system then runs software 160 having instructions implementing methods to identify the available battery power and fuel currently associated with different vehicles, and accordingly identify them to one or more of: maintain the air quality on the road surrounding, change the mode of driving for different vehicles, control the timing of the switching and the duration of the vehicle in any particular mode, change the route etc. so, that the participating vehicles are having proper distribution of different types of fuel and air in order to maintain air quality in the geo-area.

Figure 3:
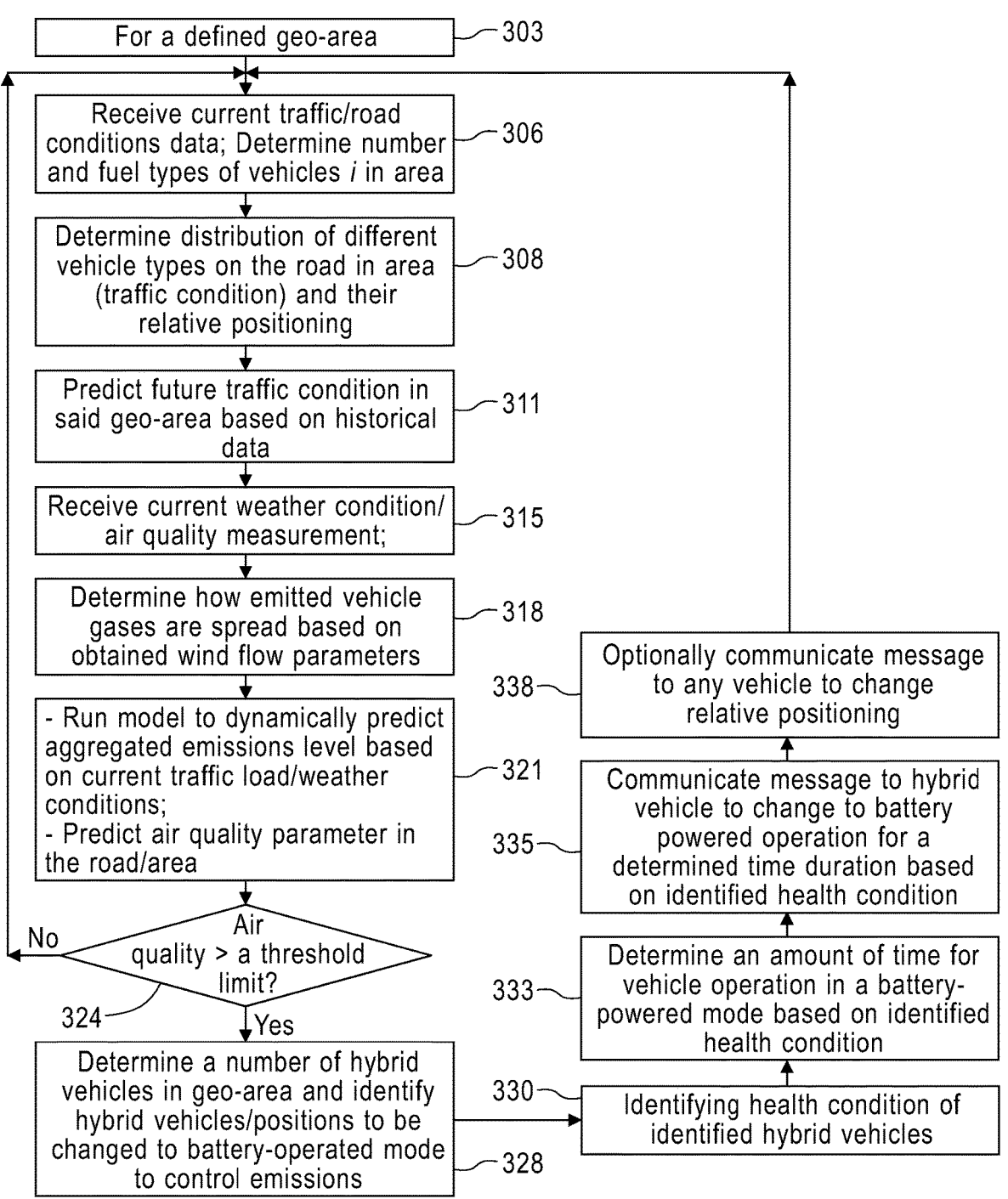
FIG. 3 depicts a method run at the system of FIG. 2 for performing dynamic adaptation of aggregated emissions level of vehicles to control air quality in any geo-fencing area in accordance with aspects of the disclosure.

FIG. 3 depicts a method run by V2X computing system server 150 according to programmed instructions of software 160 to perform a V2X computation that determines an amount of vehicles to switch operating modes from fuel-powered to battery-powered. It is understood that, besides the use of a centralized server, the vehicles in the geo-fenced area can communicate V2V messages to form an ad-hoc vehicle network with one or more of the communicating vehicles dedicated to perform the V2X computation to determine which vehicles to switch operating modes from fuel-powered to battery-powered in the geo-fenced area.

For non-limiting purposes of illustration, whether performed by the centralized server 150 or whether performed at a vehicle in a created ad-hoc vehicle communications network, a first step 303 of the V2X computation shown in FIG. 3 is to detect entry of vehicles traveling on a road into the geo-fenced area. A geo-fenced area can be a pre-determined area, e.g., a stretch of a road, a town, a city, a parking lot, a tunnel, etc. At 306, FIG. 3, for the pre-determined geo-fenced area, the system receives current traffic conditions data and based on the received data, determines a number of vehicles and the operating-mode type of each vehicle (e.g., fuel-powered, battery-powered or switchable hybrid fuel- and battery-powered) in the geo-fenced area.

As an example, referring back to FIG. 2, the V2X computing system server 150 can receive current traffic conditions data, i.e., can receive a real-time road or traffic conditions via V2X system links 51, 52, 53 associated with the predetermined geo-fenced area. In an embodiment, either prior to or at the time of their entry in the predetermined geo-fenced area, a vehicle(s) can provide data to the V2X system server 150, e.g., via a V2N message communications. For example, links 51, 52 can communicate data to the V2X server, such data including, but not limited to: the identification of the type of vehicle (e.g., sedan, truck, multi-wheel vehicle), whether the identified vehicle is battery-powered, fossil-fuel-powered or hybrid-powered which indicates the vehicle's ability to switch power operating modes, e.g., between battery-powered or fuel-powered operating mode. From the data, the V2X system server can then determine a number of vehicles entering or traveling in the geofenced-area, a number of vehicles leaving geofenced-area, and the types of the vehicle(s) such as whether it is a fossil-fuel powered or electricity (battery)-powered. Additional V2N message communication data communicated at links 51, 52, etc. can include an amount of power (e.g., fuel amount or battery charge) available for continued use by the identified vehicle. Additional V2N message data communicated by a vehicle(s) can include a current emissions level of that vehicle, e.g., a current amount or volume of exhaust gases, e.g., particulate matter, CO, $CO_2$, $NO_x$, etc. output by the vehicle while traveling in the geo-fenced area.

Further, for non-limiting purposes of illustration, in FIG. 2, the V2X computing system server 150 can receive current road/traffic conditions data, i.e., can receive a real-time traffic feed or like sensor feed 53 providing the current road conditions at the geo-fenced area. In non-limiting embodiment, current road condition data can include road specification information such as: presence of current road hazards (presence of slicks/spills), road repairs, vehicle accidents, traffic bottlenecks, or cause of any abnormal traffic flows at the road upon which the vehicles travel. This current road/traffic conditions data can be received at the V2X computing system server 150 at any time (e.g., virtually continuously or periodically).

Returning to FIG. 3, at 308, based on the received traffic/road conditions data from sensors and real-time traffic condition feeds, the V2X computing system server 150 determines a distribution of the different vehicle types on the road(s) in the geo-fenced area, and can determine their relative positioning, i.e., the positions of the vehicles relative to each other.

Continuing to FIG. 3, at 311, for the system predicts a future traffic condition in the geo-fenced area, e.g., based on historical data. For example, based on a time of day, it is determinable that the geo-fenced area will have increased number of vehicles on the road, e.g., during a rush hour.

Continuing to FIG. 3, at 315, for the pre-determined geo-fenced area, the system receives current weather conditions and/or air quality measurement (e.g., AQI) data. Based on the received weather conditions data, the V2X computing system server 150 dynamically identifies an air quality in different portions of the road, e.g., in the geo-fenced area. This air quality data can include aggregated emissions measurements within the geo-fenced area (or portions thereof) and this corresponding air quality measurements or aggregated emissions data is recorded in a further database 1152, shown in FIG. 2.

For non-limiting purposes of illustration, as shown in FIG. 2, the V2X computing system server 150 can receive current wind conditions data, i.e., can receive a real-time weather feed or like sensor feed 54 providing the current weather conditions at the geo-fenced area. Current weather condition data can include but is not limited to: the current weather conditions such as temperature, humidity, precipitation and/or wind condition(s) such as wind speed and wind direction, e.g., at the surface of the road upon which the vehicles travel. In embodiments, additionally received at the V2X computing system server 150 is an air Quality Index (AQI) value or like air pollution measure of the current air quality for the geo-fenced area. This current weather condition data can be received at the V2X computing system server 150 at any time (e.g., virtually continuously or periodically).

In embodiments, for purposes of training a machine-learned prediction model, the V2X system server 150 can store all received weather conditions data information in an associated weather conditions database 154 and stores corresponding road/traffic conditions data information in an associated road/traffic conditions database 156 correlated to the same time periods.

Returning back to FIG. 3, at 318, based on the received weather conditions data, the V2X computing system server 150 determines how emitted vehicle gases are spread based on obtained wind flow parameters (e.g., wind speed and wind direction at the road surface). Continuing to step 321, the V2X computing system server 150 runs a trained machine learned (ML) model that is trained to predict an amount of aggregated emissions in the pre-determined area based on a learned correlation between historical environment condition data at the pre-determined area recorded in past time periods and corresponding associated historical traffic loads/patterns comprising a number of vehicles in the pre-determined area during the past time periods. Based on the predicted aggregated emissions levels, the V2X computing system server 150 can calculate how much aggregated emission can be allowed within a defined time range around the geo-fenced area and predicts an air quality value at a particular road or area within the pre-determined geo-fenced area.

Continuing to 324, FIG. 3, the V2X computing system server 150 makes a determination as to whether the predicted air quality value is greater than a threshold air quality limit. The threshold air quality limit is representative of the most acceptable air quality for the particular area (or roads) upon which vehicles travel within the pre-determined geo-fenced area.

If at 324, FIG. 3, it is determined that the predicted air quality is not greater than a threshold air quality norm or limit, then the process returns back to 306, FIG. 3 in order to continue real-time monitoring of the traffic and weather conditions and dynamic air quality determinations. Otherwise, if at 324, it is determined that the predicted air quality does exceed the threshold air quality norm or limit in the geo-fenced area or portion thereof, then the process continues to 328 where the V2X computing system server 150 determines a number of hybrid vehicles in the geo-fenced area and identify hybrid vehicles/positions to be changed to battery operated mode to control (reduce) aggregated vehicle emissions. Continuing to 330, FIG. 3, based on the received vehicle information, the system then identifies the health condition of identified hybrid vehicles. This health condition reflects the amount of fuel power or battery power remaining in a hybrid vehicle and is used to determine how long a vehicle can run with a type of fuel or current battery charge. Then, continuing to 333, FIG. 3, the V2X computing system server 150 computes an amount of time that an identified hybrid vehicle can operate in a battery-powered mode of operation based upon its identified health condition. Then, continuing to 335, FIG. 3, the V2X computing system server 150 generates and communicates an individual message to each hybrid vehicle determined to have enough battery power to change to battery power for the determined amount of time in accordance with the identified health condition of the vehicle. Optionally, or in addition, at 338, FIG. 3, the V2X system can communicate messages to one or more vehicles (hybrid or otherwise) including an indication to change a vehicle spacing or vehicle location relative to another vehicle, e.g., an succeeding vehicle or adjacent, based on the identified health condition. For example, a vehicle can receive a message from the V2X computing system server 150 to change lanes, slow down to leave more space between adjacent cars on the road, or to take an alternate route or alternate road within the geo-fenced area which is calculated to reduce aggregated emissions at the road or area.

Subsequently, the method returns to step 306 in order to continue real-time monitoring of the traffic and weather conditions and dynamic emissions and air quality determinations and the method continuously repeats in order to prevent the aggregated emissions to cause the air quality in the geo-fenced area or portion thereof to exceed air quality norms.

FIG. 4 depicts an example use-case scenario 400 showing multiple vehicles 402 traveling along a road at a time that corresponding to their entry in a geo-fenced area. At 475, based on received vehicle information 410, received weather condition information 420, road specification information 430, and the acceptable air quality norm or limit, the V2X computing system server 150, or in the case of a formed ad-hoc vehicle network based on V2V messaging, a vehicle with computer processing capability, performs a V2X computation 450 to identify how many hybrid vehicles are to be changed from fuel-powered to battery-powered, determine their relative position, determine how long a vehicle is to remain in battery-powered operation (e.g., 30 minutes) and a scheduled time when to switch back from battery-powered to fuel-powered operation so that the vehicles can still maintain acceptable fuel amount or battery charge. For this, the following computation can be employed:

$$E_i^{REM} = SOC_i E^{bat} - \frac{d_i S}{100}$$

where $$E_{i_{REM}}$$

is the remaining energy of the battery at interval i, $E^{bat}$ is the initial battery capacity, and SOC is the battery's current State of Charge measured as a percentage. The additional term represents current vehicle power consumption where S is the power consumption, e.g., per 100 km, and d is distance traveled. If $$E_{i_{REM}}$$

is computed as a negative value, the electric vehicle must select the gas mode of operation.

Alternatively, or in addition, the V2X computation 450 can identify an alternate route for one or more of the vehicles to travel within the pre-determined area in order to maintain a distribution of different types of vehicles traveling in the pre-determined area.

The V2X computing system server 150, or in the case of a formed ad-hoc vehicle network based on V2V messaging, a vehicle with computer processing capability, can then initiate at 480 a communication to each of the hybrid vehicles to inform the vehicle to change from fuel-powered to battery-powered or alternatively (or in addition) communicate a message to the one or more vehicles in the pre-determined area to initiate a change of travel along an alternate route within the geo-fenced area. In the example depicted in FIG. 4, given the determined amount of vehicles and the wind flow and wind direction conditions 422, V2X messages 481 are communicated to identified hybrid vehicles 405 in order to initiate their switching from fuel-powered operation to battery-powered operation for a determined time period.

Referring to FIG. 5, there is depicted a method 500 of forming of the aggregate emissions prediction model that is run at step 321, FIG. 4, the to dynamically predict aggregated emissions level based on current traffic load/weather conditions. In FIG. 5, at 502, there is identified the predetermined geo-fenced area. Then, at 505, there is depicted the step of obtaining historical time series data including the recorded (and stored in database 154) weather conditions, including environmental parameters such as wind speed/direction, temperature, humidity, etc. linked to air quality in geo-fenced area. Additionally, at 508, corresponding to the time steps there is obtained historical vehicle traffic conditions data for the geo-fenced area. This historical traffic conditions data can include the number of vehicles and types of vehicles (e.g., fuel-powered vs. battery powered) in the geo-fenced area at the same times the environmental parameters data and air quality data is obtained. This traffic conditions data is stored in database 154.

Then, continuing at 512, there is obtained a corresponding measure or value of the aggregated vehicle emissions (e.g., air quality measure) in the geo-fenced area (or portions thereof) recorded at the time of or in near real-time coordination with the obtaining of the time series weather conditions data and traffic conditions data at or within the geo-fenced area. In building a machine-learned prediction model, the aggregated vehicle emissions or air quality measure is used as a ground truth label for supervised training of the machine-learned (ML) prediction model. Then, at 515, there is performed the training of a ML prediction model using the time-series environmental parameters, the corresponding time-series traffic conditions data, and the aggregated emissions (used as ground truth labels) such that the model can correlate weather conditions and traffic-conditions present in the geo-fenced area to a predicted air quality or aggregated emissions level. Such training can include running a linear regression, random forest or support vector machines (SVM) machine learning algorithm. The prediction model can also be trained using deep learning neural network model training methods. In an embodiment, a Lagrangian trajectory model format can be used for model training.

Continuing to 520, there is performed the determining of whether new or current weather conditions data, vehicle traffic conditions data and commensurately obtained aggregated emission measurement data is available for use in updating the trained ML aggregated emissions prediction model. If new data is available, then the process returns to 515 in order to update the trained ML prediction model that predicts aggregated emissions levels and a corresponding air quality with the new current weather conditions data, vehicle traffic conditions data and commensurately obtained aggregated emission measurement data. Otherwise, if no new data is available, the model training is idle and waits for the new current weather conditions data, vehicle traffic conditions data and commensurately obtained aggregated emission measurement data to update/revise the prediction model at 515.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

As shown in FIG. 6, computing environment 600 contains an example of an environment for the execution of at least some of the computer code involved in performing the inventive methods, such as the code in software 160 for performing the V2X computation to dynamically adapt aggregated emissions levels of vehicles to control air quality in any geo-fencing area including the generating and running of the aggregated emissions prediction model, e.g., in accordance with the method depicted in FIG. 5. In addition to software 160, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and software 160, as identified above), peripheral device set 614 (including user interface (UI) device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

Computer 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

Processor Set 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 160 in persistent storage 613.

Communication Fabric 611 is the signal conduction path that allows the various components of computer 601 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 612 is any type of volatile memory now known or to be developed in the future. Examples include dynamic type random access memory (RAM) or static type RAM. Typically, volatile memory 612 is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

Persistent Storage 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface-type operating systems that employ a kernel. The code included in block 160 typically includes at least some of the computer code involved in performing the inventive methods.

Peripheral Device Set 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 901 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a camera or emissions sensors.

Network module 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN 602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 603 is any computer system that is used and controlled by an end user (for example, a customer of an enterprise that operates computer 601) and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

Remote Server 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 901 from remote database 630 of remote server 604.

Public cloud 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment and terminology were chosen and described in order to best explain the principles of the invention and the practical application, and to enable others of ordinary skill in the art to understand the invention for various embodiments with various modifications as are suited to the particular use contemplated.

What is claimed is:

1. A method for controlling vehicle emissions comprising:
   detecting, by a hardware processor, a vehicle entry into a pre-determined area traveled by a plurality of vehicles;
   receiving, at the hardware processor, one or more environmental parameters representing a current weather condition in the pre-determined area;
   identifying, at the hardware processor, a number of vehicles traveling on one or more roads in the pre-determined area, and a type of vehicles in the area, the type of vehicles being one of: battery powered, fuel powered, and hybrid powered such that a vehicle can be battery powered or fuel powered;
   receiving, at the hardware processor, associated emission parameters from each respective vehicle;
   calculating, by the hardware processor, based on the associated emission parameters and the environmental parameters of the current weather condition, an amount of aggregated emissions allowable within the pre-determined area for a defined time range;
   determining, using the hardware processor, based on the calculated amount of aggregated emissions allowable within the pre-determined area, a number of hybrid powered vehicles in the pre-determined area that can be converted to a battery power mode of operation to render an emissions level in the area below a threshold limit; and communicating, using the hardware processor, a message to one or more of the number of hybrid powered vehicles in the area, the message informing a hybrid powered vehicle to initiate a transforming of its operating mode from a fuel powered mode of operation to a battery powered mode of operation.

2. The method as claimed in claim 1, wherein the calculating comprises:

running, using the hardware processor, a machine-learned (ML) prediction model trained to predict an amount of aggregated emissions in the pre-determined area based on a correlation between historical environment condition data at the pre-determined area recorded in past time periods and a corresponding associated historical traffic load comprising a number of vehicles in the pre-determined area during the past time periods.

3. The method as claimed in claim 2, wherein the historical environmental conditions data comprises one or more of: an emission of carbon-based gases, a realtime air quality, a wind flow speed, a wind flow adjacent to a road surface, a temperature, a humidity.

4. The method as claimed in claim 2, wherein the determining a number of hybrid powered vehicles in the pre-determined area that can be converted further comprises:

determining, by the hardware processor, an amount of available battery power and an amount of fuel of each hybrid powered vehicle in the pre-determined area;

identifying, by the hardware processor, a duration of how long each battery-powered of fuel-powered can run at their respective operating modes; and determining, by the hardware processor, one or more of the hybrid powered vehicles to switch modes of operation from fuel-powered to battery-powered and which of the hybrid powered vehicles to not switch operating modes while in the pre-determined area.

5. The method as claimed in claim 4, further comprising:

scheduling, by the hardware processor, an amount of time in which a hybrid powered vehicle is to operate in the switched battery-powered operating mode before switching back to the fuel-powered operating mode; and communicating the amount of time to the hybrid powered vehicle.

6. The method as claimed in claim 2, further comprising:

identifying, by the hardware processor, a relative positioning of the plurality of vehicles on the road relative to other vehicles traveling in the predetermined area.

7. The method as claimed in claim 6, further comprising:

identifying, by the hardware processor, an alternate route for one or more of the plurality of vehicles to travel within the pre-determined area; and communicating, using the hardware processor, a message to the one or more of the plurality of vehicles in the pre-determined area to initiate the alternate route to maintain a distribution of different types of vehicles traveling in the pre-determined area.

8. A non-transitory computer readable medium comprising instructions that, when executed by at least one hardware processor, configure the at least one hardware processor to:

detect a vehicle entry into a pre-determined area traveled by a plurality of vehicles;

receive one or more environmental parameters representing a current weather condition in the pre-determined area;

identify a number of vehicles traveling on one or more roads in the pre-determined area, and a type of vehicles in the area, the vehicle type being one of: battery powered, fuel powered, and hybrid powered such that the vehicle can be battery powered or fuel powered;

receive associated emission parameters from each respective vehicle;

calculate, based on the associated emission parameters and the environmental parameters of the current weather condition, an amount of aggregated emissions allowable within the pre- determined area for a defined time range;

determine based on the calculated amount of aggregated emissions allowable within the pre-determined area, a number of hybrid powered vehicles in the pre-determined area that can be converted to a battery power mode of operation to render an emissions level in the area below a threshold limit; and communicate a message to one or more of the number of hybrid powered vehicles in the area, the message informing a hybrid powered vehicle to initiate a transforming of its operating mode from a fuel powered mode of operation to a battery powered mode of operation.

9. The non-transitory computer readable medium as claimed in claim 8, wherein to calculate an amount of aggregated emissions, the instructions further configure the at least one hardware processor to:

run a machine-learned (ML) prediction model trained to predict an amount of aggregated emissions in the pre-determined area based on a correlation between historical environment condition data at the pre-determined area recorded in past time periods and a corresponding associated historical traffic load comprising a number of vehicles in the pre-determined area during the past time period.

10. The non-transitory computer readable medium as claimed in claim 9, wherein the historical environmental conditions data comprises one or more of: an emission of carbon-based gases, a realtime air quality, a wind flow speed, a wind flow adjacent to a road surface, a temperature, a humidity.

11. The non-transitory computer readable medium as claimed in claim 9, wherein to determine a number of hybrid powered vehicles in the pre-determined area that can be converted, the instructions further configure the at least one hardware processor to:

determine an amount of available battery power and an amount of fuel of each hybrid powered vehicle in the pre-determined area;

identify a duration of how long each battery-powered of fuel-powered can run at their respective operating modes; and determine one or more of the hybrid powered vehicles to switch modes of operation from fuel-powered to battery-powered and which of the hybrid powered vehicles to not switch operating modes while in the pre-determined area.

12. The non-transitory computer readable medium as claimed in claim 11, wherein the instructions further configure the at least one hardware processor to:

schedule an amount of time in which a hybrid powered vehicle is to operate in the switched battery-powered operating mode before switching back to the fuel-powered operating mode; and communicate the amount of time to the hybrid powered vehicle.

13. The non-transitory computer readable medium as claimed in claim 9, wherein to determine a number of hybrid powered vehicles in the pre-determined area that can be converted, the instructions further configure the at least one hardware processor to:

identify a relative positioning of the plurality of vehicles on a road relative to other vehicles traveling in the predetermined area.

14. The non-transitory computer readable medium as claimed in claim 13, wherein the instructions further configure the at least one hardware processor to:

identify an alternate route for one or more of the plurality of vehicles to travel within the pre-determined area; and communicate a message to the one or more of the plurality of vehicles in the pre- determined area to initiate the alternate route to maintain a distribution of different types of vehicles traveling in the pre-determined area.

15. A computer-implemented system for controlling vehicle emissions comprising:

a memory storage device; and a hardware processor coupled to the memory storage device and configured to perform a method to:

detect a vehicle entry into a pre-determined area traveled by a plurality of vehicles;

receive one or more environmental parameters representing a current weather condition in the pre-determined area;

identify a number of vehicles traveling on one or more roads in the pre-determined area, and a type of vehicles in the area, the vehicle type being one of: battery powered, fuel powered, and hybrid powered such that the vehicle can be battery powered or fuel powered;

receive associated emission parameters from each respective vehicle;

calculate, based on the associated emission parameters and the environmental parameters of the current weather condition, an amount of aggregated emissions allowable within the pre- determined area for a defined time range;

determine based on the calculated amount of aggregated emissions allowable within the pre-determined area, a number of hybrid powered vehicles in the pre-determined area that can be converted to a battery power mode of operation to render an emissions level in the area below a threshold limit; and communicate a message to one or more of the number of hybrid powered vehicles in the area, the message informing a hybrid powered vehicle to initiate a transforming of its operating mode from a fuel powered mode of operation to a battery powered mode of operation.

16. The system as claimed in claim 15, wherein to calculate an amount of aggregated emissions, the hardware processor is further configured to:

run a machine-learned (ML) prediction model trained to predict an amount of aggregated emissions in the pre-determined area based on a correlation between historical environment condition data at the pre-determined area recorded in past time periods and a corresponding associated historical traffic load comprising a number of vehicles in the pre-determined area during the past time period.

17. The system as claimed in claim 16, wherein to determine a number of hybrid powered vehicles in the pre-determined area that can be converted, the hardware processor is further configured to:

determine an amount of available battery power and an amount of fuel of each hybrid powered vehicle in the pre-determined area;

identify a duration of how long each battery-powered of fuel-powered can run at their respective operating modes; and determine one or more of the hybrid powered vehicles to switch modes of operation from fuel-powered to battery-powered and which of the hybrid powered vehicles to not switch operating modes while in the pre-determined area.

18. The system as claimed in claim 17, wherein the hardware processor is further configured to:

schedule an amount of time in which a hybrid powered vehicle is to operate in the switched battery-powered operating mode before switching back to the fuel-powered operating mode; and communicate the amount of time to the vehicle.

19. The system as claimed in claim 16, wherein to determine a number of hybrid powered vehicles in the pre-determined area that can be converted, the hardware processor is further configured to:

identify a relative positioning of the plurality of vehicles on a road relative to other vehicles traveling in the predetermined area.

20. The system as claimed in claim 19, wherein the instructions further configure the at least one hardware processor to:

identify an alternate route for one or more of the plurality of vehicles to travel within the pre-determined area-so that to be changed; and communicate a message to the one or more of the plurality of vehicles in the pre- determined area to initiate the alternate route to maintain a distribution of different types of vehicles traveling in the pre-determined area.

\* \* \* \* \*